United States Patent
Wicki et al.

(10) Patent No.: US 10,007,629 B2
(45) Date of Patent: Jun. 26, 2018

(54) INTER-PROCESSOR BUS LINK AND SWITCH CHIP FAILURE RECOVERY

(71) Applicant: Oracle International Corporation, Redwood City, CA (US)

(72) Inventors: Thomas Wicki, Palo Alto, CA (US); David Smentek, Cupertino, CA (US); Sumti Jairath, Santa Clara, CA (US); Kathirgamar Aingaran, San Jose, CA (US); Ali Vahidsafa, Palo Alto, CA (US); Paul Loewenstein, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 162 days.

(21) Appl. No.: 14/598,640

(22) Filed: Jan. 16, 2015

(65) Prior Publication Data
US 2016/0210255 A1    Jul. 21, 2016

(51) Int. Cl.
| | | |
|---|---|---|
| G06F 11/00 | (2006.01) | |
| G06F 13/40 | (2006.01) | |
| G06F 11/30 | (2006.01) | |
| G06F 11/22 | (2006.01) | |

(52) U.S. Cl.
CPC ........ *G06F 13/4022* (2013.01); *G06F 11/221* (2013.01); *G06F 11/3027* (2013.01)

(58) Field of Classification Search
USPC .......................................................... 714/4.2
See application file for complete search history.

(56) References Cited

U.S. PATENT DOCUMENTS

| | | | |
|---|---|---|---|
| 5,440,741 A | 8/1995 | Morales | |
| 5,884,018 A | 3/1999 | Jardine | |
| 6,002,851 A | 12/1999 | Basavaiah | |
| 6,865,157 B1 | 3/2005 | Scott | |
| 7,308,604 B2 | 12/2007 | McDonnell | |
| 8,208,370 B1* | 6/2012 | Mitchell, Jr. | H04L 41/0659 370/217 |
| 2007/0016830 A1* | 1/2007 | Hasha | G06F 8/38 714/38.1 |
| 2011/0276826 A1* | 11/2011 | Schoppmeier | H04L 1/1896 714/16 |

(Continued)

FOREIGN PATENT DOCUMENTS

EP    1193597    4/2002

*Primary Examiner* — Sarai E Butler
(74) *Attorney, Agent, or Firm* — Meyertons, Hood, Kivlin, Kowert & Goetzel, P.C.

(57) ABSTRACT

A system is disclosed in which the system may include multiple bus switches, and multiple processors. Each processor may be coupled to each bus switch. Each processor may be configured to initiate a transfer of data to a given bus switch, and detect if a respective link to the given bus switch is inoperable. In response to detecting an inoperable link to a first bus switch, a given processor may be further configured to send a notification message to at least one other processor via at least a second bus switch and to remove routing information corresponding to the inoperable link from a first register. The at least one other processor may be configured to remove additional routing information corresponding to the inoperable link from a second register in response to receiving the notification message from the given processor.

20 Claims, 8 Drawing Sheets

(56) References Cited

U.S. PATENT DOCUMENTS

2011/0320419 A1* 12/2011 Johnston ........... G06F 17/30309
707/703
2016/0103745 A1* 4/2016 Zhou ................... G06F 11/2094
714/6.3

* cited by examiner

INTER-PROCESSOR BUS LINK AND SWITCH CHIP FAILURE RECOVERY

BACKGROUND

Technical Field

The embodiments disclosed within relate to multi-processor systems, and more particularly, to the operation of communication channels in a multi-processor system.

Description of the Related Art

Processors are used in a variety of applications including cellular telephones, personal computers, servers, and distributed computing systems. In some applications, multiple processors or processor cores may be connected together so that computation tasks may be shared among the various processors. Whether used individually, or as part of a group, processors make use of sequential logic circuits, internal memory, registers, state machines, and the like, to execute program instructions and operate on input data.

The performance of computing systems is dependent on both hardware and software. In order to increase the throughput of computing systems, some tasks may be performed in parallel. To this end, compilers may identify tasks which may be performed in parallel in program code, and hardware may include multiple copies of structures to execute the identified tasks. The structures may include functional units, processor cores, and nodes. With various functional blocks operating on, exchanging, and calculating various groups of data, a need to quickly and reliably exchange data structures between two or more processors may be a requirement.

Communication between the multiple processors may utilize one or more communication networks. An example implementation of such a communication network may include one or more bus switches or network hubs that direct messages from a source processor to a destination processor. If a link between a processor and a bus switch fails or if a bus switch itself becomes inoperable, then communication may be interrupted to the processor, potentially leading to a loss of performance and/or downtime for the system while the failure is diagnosed and repaired.

SUMMARY

Various embodiments of an apparatus and a method for implementing a communication network are disclosed. Broadly speaking, a system is contemplated in which the system may include a plurality of bus switches, and a plurality of processors. Each processor may be coupled to each bus switch of the plurality of bus switches. Each processor may be configured to initiate a transfer of data to a given bus switch of the plurality of bus switches, and to detect that a respective link to the given bus switch is inoperable. In response to a given processor detecting an inoperable link between the given processor and a first bus switch, the given processor may be further configured to send a notification message to at least one other processor of the plurality of processors via at least a second bus switch of the plurality of bus switches. The given processor may also be configured to remove routing information corresponding to the inoperable link from a first register in response to detecting the inoperable link, wherein the routing information may be utilized by the given processor to route one or more messages sent by the given processor. The at least one other processor may be configured to remove additional routing information corresponding to the inoperable link from a second register in response to receiving the notification message from the given processor, wherein the additional routing information may be utilized by the at least one other processor to route one or more messages sent by the at least one other processor.

In a further embodiment, the notification message may include information identifying the inoperable link. In one embodiment, the given processor may be further configured to discard pending data transfers that are queued to be sent by the given processor, via the inoperable link, in response to detecting the inoperable link.

In another embodiment, each processor of the plurality of processors may be further configured to measure a predetermined amount of time from initiating a data transfer to another processor. In a further embodiment, each processor may be further configured to assert an error signal in response to a determination the data transfer was not received by the another processor within the predetermined amount of time. In one embodiment, the at least one other processor may be further configured to discard pending data transfers that are queued to be sent by the at least one other processor, via the inoperable link, in response to receiving the notification message from the given processor.

In a given embodiment, the given processor may be further configured to detect the inoperable link to the first bus switch while operating in a first mode, wherein the given processor may prevent access to the first register while operating in the first mode. The given processor may then be configured to enter a second mode from the first mode in response to detecting the inoperable link, wherein the given processor may allow access to the first register while operating in the second mode. The given processor may then be configured to send the notification message to the at least one other processor via the at least second bus switch in response to entering the second mode.

Figure 1:
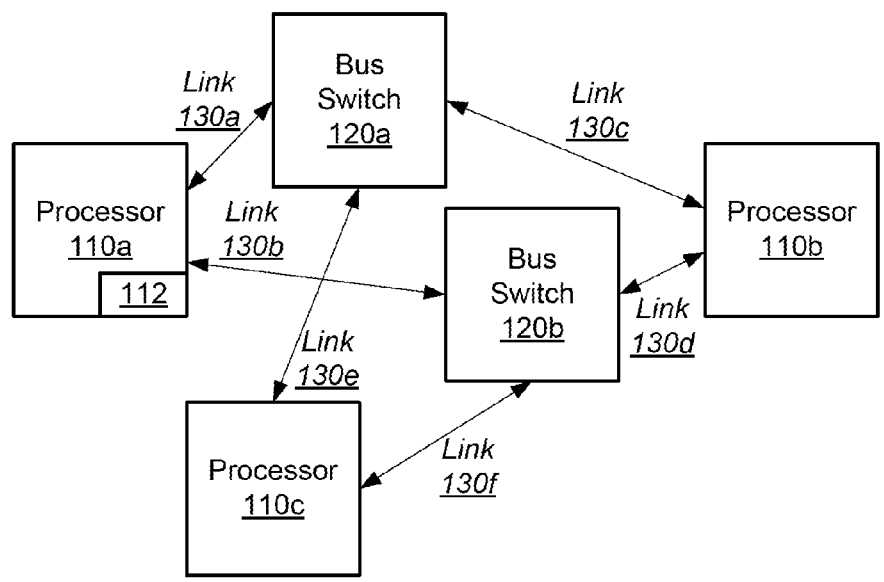
FIG. 1 illustrates a block diagram of an embodiment of a multi-processor communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure.

Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f), interpretation for that unit/circuit/component.

DETAILED DESCRIPTION OF EMBODIMENTS

In order to increase the throughput of computing systems or to improve fault tolerance, parallelization of tasks may be enabled by including multiple processors connected through a communication network. The communication network may include one or more buses or links to quickly and reliably exchange data between two or more processors. One embodiment of such a communication network may include one or more bus switches or network hubs to direct messages from a source processor to a destination processor. In some embodiments, each processor may have more than one available path for sending and receiving messages. In such an embodiment, each processor in the network may include a routing table to indicate a selected path for sending messages to each of the other processors. The routing table may specify a given set of communication links and a bus switch for sending a message to a given processor. In some embodiments, routing tables may change over time as routing information is updated to balance network traffic, relieving traffic on busy links by moving some data transmissions to links with more available bandwidth. In other embodiments, routing tables may include multiple paths between a source processor and a destination processor and network traffic may be balanced across available paths.

If a communication link or a bus switch becomes inoperable, then the system may require a reset, a power cycle, or even a physical replacement of parts. Any of these cases may result in a period of "downtime" in which the system is unusable as the inoperable link recovers and restarts data transmission. In various cases, downtime may be on the order of seconds or minutes for a reset or a power cycle, up to days, weeks or even months if a part of the system requires replacement. In some embodiments, multiple processors may be included in the system while only one link may be inoperable in a particular occurrence.

Systems and methods described herein disclose embodiments that may reduce or eliminate downtime by identifying an inoperable link or bus switch and verifying an alternate path is available for any processor coupled to the inoperable link or switch. In some embodiments, the inoperable path may be removed from the routing table of processors. Downtime may be avoided by continuing to operate around the inoperable link or switch until a replacement part is available or other repair is made.

System Overview

FIG. 1 illustrates a block diagram depicting an embodiment of a multi-processor communication system. In the illustrated embodiment, system 100 includes processors 110a-c, each coupled to bus switches 120a-b via communication links 130a-f. In various embodiments, system 100 may be configured as a rack-mountable server system, a standalone system, or any other suitable form factor. In some embodiments, system 100 may be configured as a computer workstation rather than a server system.

Each of processors 110a-c may include one or more processor cores. In some embodiments, each of processors 110a-c may be coupled to a corresponding system memory, or processors 110a-c may share a common system memory. Processors 110a-c may be configured to work concurrently on a single computing task and may communicate with each other to coordinate processing on that task. For example, a computing task may be divided into three parts and each part may be assigned to one of processors 110a-c.

Processors 110a-c may communicate to one another via bus switches 120a-b. Bus switches 120a-b may route messages from a first processor to a second processor using identification information received from the first processor, such as an end point address, node number, or link identification (ID). For example, processor 110a may have a message to send to processor 110b. Processor 110a may include routing information to establish a path for communicating to other processors 110, such as routing table 112. Routing table 112 may include a respective local link ID and respective remote link ID to be used for communicating to processor 110b and to processor 110c. As used herein, a local link may refer to a link between processor 110a and a given bus switch 120 and a remote link may refer to the communication links between the given bus switch 120 and another processor 110. In the example of FIG. 1, local links for processor 110a may include link 130a and link 130b and remote links may include links 130c-f. In relation to processor 110b, local links may include links 130c-d, while remote links may include links 130a-b and links 130e-f.

In some embodiments, communication links 130 may be initialized before being used to transmit messages. This initialization process may be referred to as "link training" and may consist of setting various parameters of the communication link to establish a suitable performance level. Link training may be performed during a boot process of system 100, and may also be performed during operation if performance of a link falls below a threshold level.

One embodiment of routing table 112 for processor 110a may indicate that to communicate to processor 110b, local link 130a and remote link 130c should be used. The same embodiment of routing table 112 may indicate that local link 130b and remote link 130f should be used to communicate with processor 110c. Another embodiment of routing table 112 may indicate that processor 110b should again be addressed through local link 130a and remote link 130c and that local link 130a and remote link 130e should be used for communicating with processor 110c. It is noted that, in the present embodiment, each processor 110 includes two communication paths to each of the other processors 110. Each processor 110 may, therefore, have four possible combinations of routing tables. A default routing table may be established for each processor 110 through a software or hardware initialization process. In some embodiments, the default routing tables may be defined during the design of the hardware and/or software, while in other embodiments, the default tables may be defined dynamically during the initialization process. The routing tables may be defined dependent upon various criteria, such as the physical layout of a circuit board to minimize the physical lengths of paths, or an expected level of message traffic between the processors 110 to reduce message latency and increase communication bandwidth.

Regardless of how the routing tables are defined, the default tables may be modified by their respective processor during operation. In some embodiments, a default routing table may be modified to remove a faulty or inoperable communication link 130 or bus switch 120. During operation, a communication link 130 may be damaged or otherwise become inoperable, such as, for example, a solder joint may break loose due to temperature changes, a trace on a circuit board may be cut accidentally during an installation or maintenance procedure, or a cable from one system to another may be disconnected for various reasons. Also, a bus switch 120 may be damaged by an electrostatic discharge (ESD) or transition into an inoperable state due to a high voltage transient. If a communication link 130 or bus switch 120 becomes inoperable, then processors 110 may modify their respective routing table to avoid using that link 130 or switch 120. More details on modifying routing tables will be discussed below.

The embodiment of the multi-processor communication system illustrated in FIG. 1 is one of several examples. In other embodiments, different numbers and configurations of components are possible and contemplated. For example, different numbers of processors and/or bus switches are contemplated.

Figure 2:
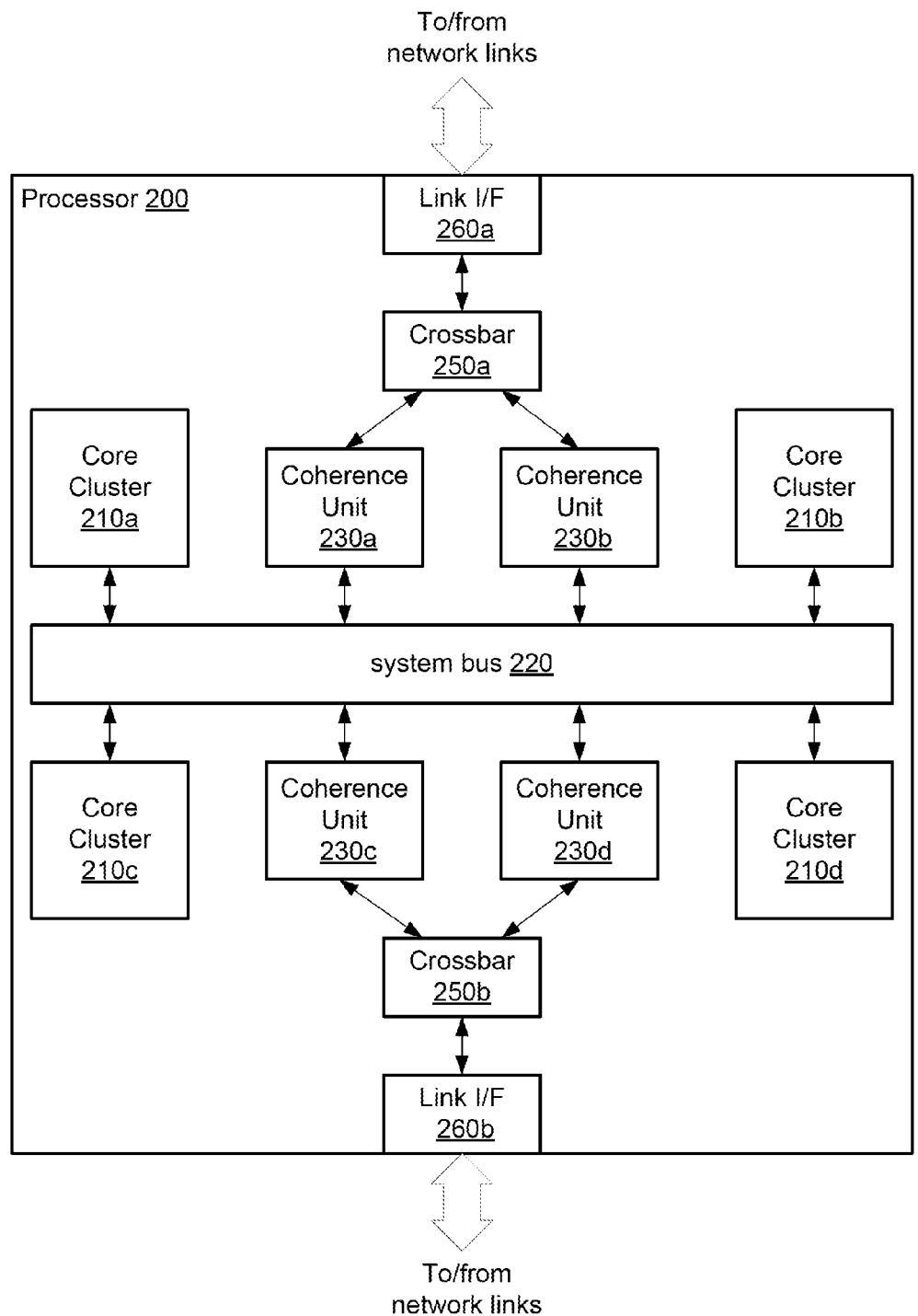
FIG. 2 is a block diagram of an embodiment of a processor.

Turning now to FIG. 2, a block diagram illustrating one embodiment of a processor 200 is shown. Processor 200 may correspond to an embodiment of processors 110 in FIG. 1. In the illustrated embodiment, processor 200 may include a plurality of core clusters 210*a-d*, each of which may be coupled to system bus 220. Coherence units 230*a-d* may also be coupled to system bus 220. Crossbar switch 250*a* may be coupled to coherence units 230*a* and 230*b*, as well as to link interface (I/F) 260*a*. Similarly, crossbar switch 250*b* may be coupled to coherence units 230*c* and 230*d*, as well as to link interface 260*b*. Each of link interfaces 260*a-b* may also be coupled to one or more bus network devices or switches (not shown). In some embodiments, the elements included in processor 200 may be fabricated as part of a single integrated circuit (IC), for example on a single semiconductor die.

Each core cluster 210 may include one or more cores as well as one or more caches. It is noted that although 4 core clusters are shown, in various embodiments, any suitable number of core clusters may be incorporated. Each core of core clusters 210*a-d* may be configured to execute instructions and to process data according to a particular instruction set architecture (ISA). In one embodiment, cores may be configured to implement the SPARC® V9 ISA, although in other embodiments it is contemplated that any desired ISA may be employed, such as x86, PowerPC®, ARM® or MIPS®, for example. In the illustrated embodiment, each core of core clusters 210*a-d* may be configured to operate independently of the others, such that all cores may execute instructions in parallel. Additionally, in some embodiments, each core may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multi-threaded (MT) core. In one embodiment, each core cluster 210 may include two cores and each core may be configured to concurrently execute instructions from eight threads, for a total of 64 threads concurrently executing across processor 200.

Each core of core clusters 210*a-d* may be capable of operating in a variety of modes, including a normal run mode and a privileged mode. In some embodiments, a core may be required to be in the privileged mode to access certain restricted memory locations, access certain restricted control registers, or process certain restricted instructions that may otherwise be unavailable in the normal run mode. Other embodiments may include an additional privileged mode, such as a hyper-privileged mode, which may enable a core running in the hyper-privileged mode to access the restricted instructions, memory locations, and/or control registers from the privileged mode as well as additional instructions, memory locations, and/or control registers otherwise restricted from the normal run and privileged modes. In some embodiments, a given core may prevent itself from accessing restricted instructions, memory locations, or control registers when the given core is not operating in the privileged or hyper-privileged mode. In other embodiments, the prevention of accessing the restricted instructions, memory locations, or control registers may be controlled by another circuit in processor 200, such as a memory controller, for example, or by another device, such as a security processor, for example.

Each core cluster 210 may also include one or more data management units (DMUs). In some embodiments, the DMUs may be located in a memory controller unit (not shown in FIG. 2) rather than core cluster 210. The DMUs may send and receive messages to cores in other processors as needed by a coupled core. For example, a DMU in core cluster 210*b* in a first processor 200 may send a message to a DMU in core cluster 210*c* in a second processor 200 in response to a command from a core in core cluster 210*b*. Furthermore, the DMUs may assert a signal to a coupled core if the DMU determines that a reply to a sent message did not arrive within a predetermined amount of time, i.e., the message reply timed-out. The asserted signal from the DMU may trigger a coupled core to enter the privileged or hyper-privileged mode, and therefore, have access to the restricted memory, control registers, and/or instructions which may be used to initiate a corrective action for the message time-out.

System bus 220 may be implemented as an on-chip network for enabling communication between the various functional blocks included in processor 200. Cores and DMUs from core cluster 210*a* may communicate with cores in core cluster 210*d*, for example. System bus 220 may also allow coherence units 230 to communicate with other functional blocks to update states of various data transactions occurring in processor 200 and other components of system 100.

Coherence units 230*a-d* may track memory addresses corresponding to data currently stored in caches or internal memory of core clusters 210*a-d*. In a processor with a multi-level cache configuration, data from a given memory address in system memory may be concurrently stored in two or more levels of cache. Coherence units 230*a-d* may force an invalidation of data stored in a cache before the data from the same memory address is modified in another cache. To perform such functions, coherence unit 230 may have access to all levels of cache memory as well as to off-chip memory. Coherence units 230*a-d* may issue a memory request to an external memory location if a requested memory location is not currently stored in a cache in processor 200.

Coherence units 230 may also direct messages to cores in other processors. If a DMU requests a message to be sent to a destination DMU in another processor, the request may be received by a coherence unit 230. The coherence unit 230 may include information for routing the message to the destination DMU, such as a routing table or registers that may indicate a set of predetermined paths to reach the destination core. The coherence unit 230 may receive the message request and select a predetermined path for transmitting the message to the destination DMU and then issue a message transmittal request to a link interface 260, via a crossbar 250.

Crossbar switches 250*a-b* may provide a communication path to various external devices via link interfaces 260*a-b*. Crossbar switches 250 may coordinate and prioritize connections from multiple sources to multiple destinations. For example, crossbar 250*a* may receive commands from both coherence unit 230*a* and 230*b* to connect to link interface 260*a* at a same period in time. Crossbar 250*a* may prioritize the command from coherence unit 230*b* due to one or more criteria, such as, for example, a predetermined priority assigned to each coherence unit 230, a priority value included in the command, historical usage data (i.e., which coherence unit 230 has used the connection to link interface 260 most recently or most often), or any other suitable criteria. In some embodiments, crossbar switches 250 may be coupled to more functional blocks than shown in FIG. 2 and/or may have multiple connections to link interfaces 260. In such embodiments, crossbar switches 250 may support parallel access to link interfaces 260 or other functional blocks by two or more coupled coherence units 230 as long as the two or more coupled coherence units 230 are not requesting the same destination.

Link interfaces 260 may be configured to coordinate data transfer between processor 200 and one or more devices (e.g., other processors or other computing systems) coupled to processor 200 via a network. In one embodiment, link interfaces 260 may be configured to perform the data processing in order to implement an Ethernet (IEEE 802.3) networking standard such as Gigabit Ethernet or 10-Gigabit Ethernet, for example, although it is contemplated that any suitable networking standard may be implemented, including proprietary networks. In some embodiments, link interfaces 260 may be configured to implement multiple discrete network interface ports. Link interfaces 260*a-b* may support one or more bus types, such as, for example, token rings, point-to-point, or mesh interconnects. Link interfaces 260 may also support multiple connections, or communication links to a single type of bus, allowing for multiple bus transactions to occur in parallel. One or more core clusters 210*a-d* may access system memory, network devices or other peripheral devices via link interfaces 260*a-b*.

Link interfaces 260, may, in some embodiments, perform link training on one or more communication links 130 before using any communication link 130 to exchange messages. The link training may consist of setting various parameters of the communication link to establish a suitable performance level to compensate for various physical variations, such as impedance of circuit board traces or cables, as well as any operating conditions that may change over time, such as temperature or voltage. Link training may be performed during a boot process of processor 200, and may also be performed as needed during operation if performance of a link falls below a threshold level or a new link is added or activated. If a link training fails for a given communication link 130, then the link interface 260 coupled to the given communication link 130 may trigger an alert to a predetermined core within processor 200, for example, by triggering an exception or interrupt signal.

In some embodiments, link interfaces 260*a* and 260*b* may provide different paths into a network, allowing for additional paths into the network, for example, to expand a network to additional devices. In such embodiments, link interfaces 260*a* and 260*b* may operate independently, providing independent interfaces into the network. In other embodiments, link interfaces 260*a* and 260*b* may be coupled to redundant networks, providing alternate paths to a same set of devices, thereby allowing for additional bandwidth to the set of devices as well as providing a possible back-up in the event of a failure or problem in a given communication path.

It is noted that the term "parallel" as used herein, refers to two or more actions occurring within a same time period, such as during one or more cycles of a received clock signal, for example. In some cases, a first action may begin before a second action begins and may end before the second action ends. For example, crossbar switch 250*a* may be considered to connect coherence units 230*a* and 230*b* to link interface 260*a* in parallel if at least one bit of data is transmitted by each coherence unit to link interface 260*a* in a same clock cycle. The term "parallel" is not intended to imply the two or more actions begin and end at precisely the same time.

The embodiment of the processor illustrated in FIG. 2 is merely an example for demonstrative purposes. Various functional blocks have been omitted for clarity. In various embodiments, different functional blocks may be included and are contemplated. For example, one or more blocks such as caches, memory interfaces, or direct memory access units may be included. Furthermore, FIG. 2 merely illustrates logical coupling of the various functional blocks and is not intended to demonstrate a physical layout of processor 200.

Figure 3:
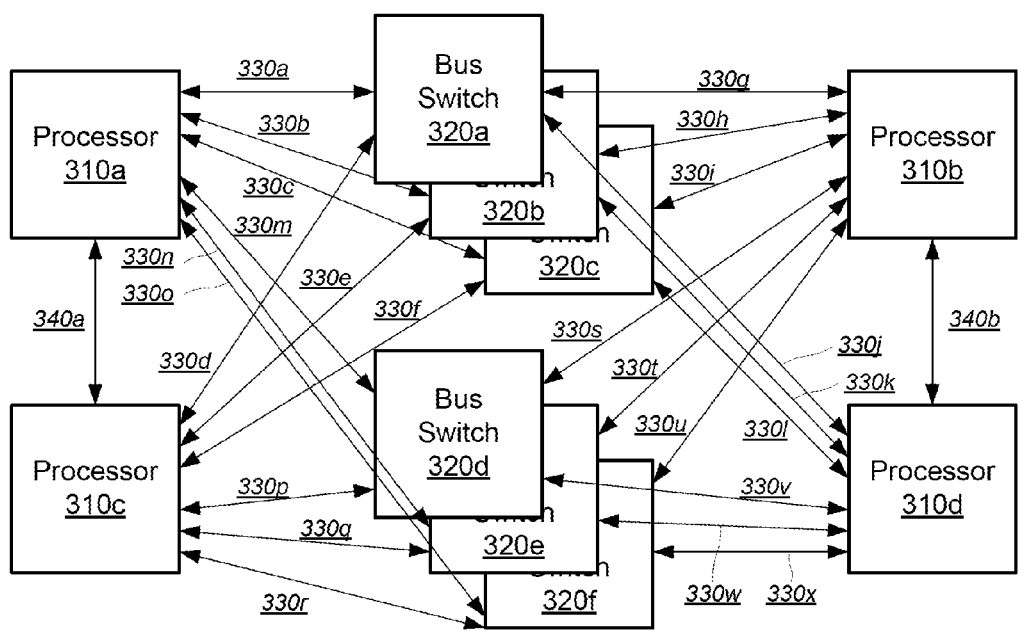
FIG. 3 is a block diagram of another embodiment of a multi-processor communication network.

Moving now to FIG. 3, a block diagram of another embodiment of a multi-processor communication network is illustrated. System 300 of FIG. 3 may be similar to that system 100 of FIG. 1. System 300, however, may include more processors 310*a-d* coupled to more bus switches 320*a-f* via more communication links 330*a-x*. In addition, system 300 may include processor interconnects 340*a* coupling processor 310*a* to processor 310*c* and processor interconnect 340*b* coupling processor 310*b* to processor 310*d*. Similar to system 100, system 300 may be configured as a rack-mountable server system, a standalone system, or in any suitable form factor. In some embodiments, system 300 may be configured as a client system rather than a server system.

Processors 310*a-d* may be similar to the description provided above for processors 110*a-c* in FIG. 1, as well as processor 200 in FIG. 2. Although four processors 310 are shown in FIG. 3, any suitable number of processors is contemplated. Processors 310*a-d* may include any number of cores, from one to 32 or even more. Processors 310 may be grouped together into processing blocks, such that a subset of processors 310 may be connected via direct processor interconnects 340, avoiding communication through bus switches 320. In the present embodiment, processors 310*a* and 310*c* may represent a first processing block coupled via processor interconnect 340*a* and processors 310*b* and 310*d* may represent a second block coupled via interconnect 340*b*. A processor 310 of the first processing block may communicate to a processor 310 of the second processing block via links 330 and bus switches 320.

To facilitate communication between processors 310, and more specifically, to support communication from any core in a first processing block to any core in a second processing block, a number of bus switches 320 may be organized and coupled to provide redundant paths between processors 310. Bus switches 320*a-c*, in combination with communication links 330*a-l*, may collectively form a first set communication paths between processors 310*a-d*. Similarly, bus switches 320*d-f* along with communication links 330*m-x* may form a second set of communication paths among processors 310*a-d*. Each set of communication paths may be referred to as "network planes" or simply "planes." Each communication plane may couple to a respective link interface 260 in a processor 200 in FIG. 2. For example, in the present embodiment, links 330*a-c* of the first plane may be coupled to link interface 260*a* of processor 310*a*, while links 330*m-o* of the second plane may be coupled to link interface 260*b* of processor 310*a*. Each plane may provide three paths between any pair of processors 310, one path through each of bus switches 320, and therefore the two planes in combination may provide 6 paths between any pair of processors 310. The redundant paths may be used to improve bandwidth for communication among processors 310 by allowing more parallelism for data transmissions. In addition, the redundant paths may also allow for continued operation if one or more paths 330 or even one or more entire bus switch 320 becomes inoperable.

Routing information may be stored in each processor 310 to indicate which communication links 330 are available to be used for communicating to a given destination processor 310. Multiple paths may exists between two given processors 310 which may improve bandwidth between the given processors and to provide redundancy in the event one path becomes inoperable. Routing information may be established as described above in regards to FIG. 1.

Processor interconnects 340*a-b* may provide a direct communication path between processors 310 in a common processing group. The communication path through processor interconnects 340 may, in some embodiments, provide higher bandwidth and/or lower latency communication between the coupled processors 310 than via bus switches 320 and paths 330. In some embodiments, processors 310 coupled to a common processor interconnect 340 may only communicate via that processor interconnect 340, while in other embodiments, processors 310 may be able to communicate to other processors via corresponding links 330 and bus switch 320 as well as by way of a common processor interconnect. For example, processors 310*a* and 310*c* may prioritize communication to each other via processor interconnect 340*a*, but may additionally communicate, via bus switch 320*a* and links 330*a* and 330*d* (or other corresponding combination of bus switch 320 and links 330) if processor interconnect 340*a* is unable to do so.

The embodiment of the multi-processor communication system in FIG. 3 is merely one example. Other embodiments may include different numbers and/or configurations of processors and/or bus switches. Moreover, some embodiments may not include processor interconnects 340*a-b*.
Routing Tables Turning to FIG. 4, two tables are illustrated demonstrating changes to a routing table. Tables 400*a-b* may represent routing information for a processor such as, for example, processor 310*a* in FIG. 3, to communicate with other processors via a network, such as shown by system 300 in FIG. 3. Although the routing information is illustrated in tabular form, the routing information may be stored in processor 310*a* in any suitable format, such as, for example, one or more registers or memory locations. Tables 400*a-b* may illustrate routing information before (400*a*) and after (400*b*) the routing information is updated in response to detecting an inoperable link. Referring collectively to system 300 and FIG. 4, tables 400*a-b* includes three columns, including local link 401, may identify the local links coupled to processor 310*a*. The next column, link status 402, may identify if the corresponding local link is enabled or disabled. The last column, processor list 403, may indicate a list of one or more processors accessible via the corresponding local link. More entries in tables 400 may exist, but are not shown for the sake of brevity.

Table 400*a* may represent a default state of routing information in processor 310*a*. In various embodiments, table 400*a* may be stored in tabular form in a memory in processor 310*a*, in one or more registers of a coherence unit, such as coherence units 230 in FIG. 2, or in any other suitable format. The initial state of the routing information may be predetermined and stored in a non-volatile memory or in hardware such as switches in system 300. In other embodiments, the routing information may be determined dynamically during an initialization process of system 300. In the present embodiment, the default state of all local links for processor 310*a* is with all local links enabled.

Processor 310*a* may detect that communication link 330*b* is inoperable. The detection may be made, for example, by link interface 260*a* in processor 310*a*. Processor 310*a* may have performed a link training process (or other initialization process) on link 330*b* and link 330*b* may have failed the link training. In some cases, communication link 330*b* may be inoperable due to a physical disruption in the connection between processor 310*a* and bus switch 320*b* (e.g., a bad solder joint on the circuit board or a cut or disconnected cable) or may be due to bus switch 320*b* is inoperable itself due to damage or to electromagnetic interference. In the latter case, links 330*e*, 330*h*, and 330*k* may also be inoperable.

In response to detecting the inoperable link, circuits in processor 310*a*, such as, for example, link interface 260*a*, may assert a signal to a corresponding core indicating an inoperable link has been detected. In some embodiments, the asserted signal may cause the core to enter a privileged or hyper-privileged mode. Running in the privileged/hyper-privileged mode may allow the core to modify the routing information which may be unchangeable in other operating modes. While in the privileged or hyper-privileged mode, the core may disable link 330*b* by setting the link status 402 to disabled, as shown in table 400*b*. The core may not be required to enter a privileged or hyper-privileged mode to modify the routing information in other embodiments. In various embodiments, disabling a communication link may comprise setting or clearing one or more bits of a register or writing a predetermined value to a corresponding memory location. In some embodiments, the core may also clear the processor list 403 corresponding to link 330*b*, as shown in table 400*b*. The core may determine if a suitable alternative path is available for each processor with which processor 310*a* communicates. If processor 310*a* determines an alternative path is available for the other processors, then processor 310*a* may send a link failure notification message to processors 310*b-d*, alerting them that link 330*b* is inoperable. Processors 310*b-d*, may, in response, perform similar updates to their respective routing information.

Figure 4:
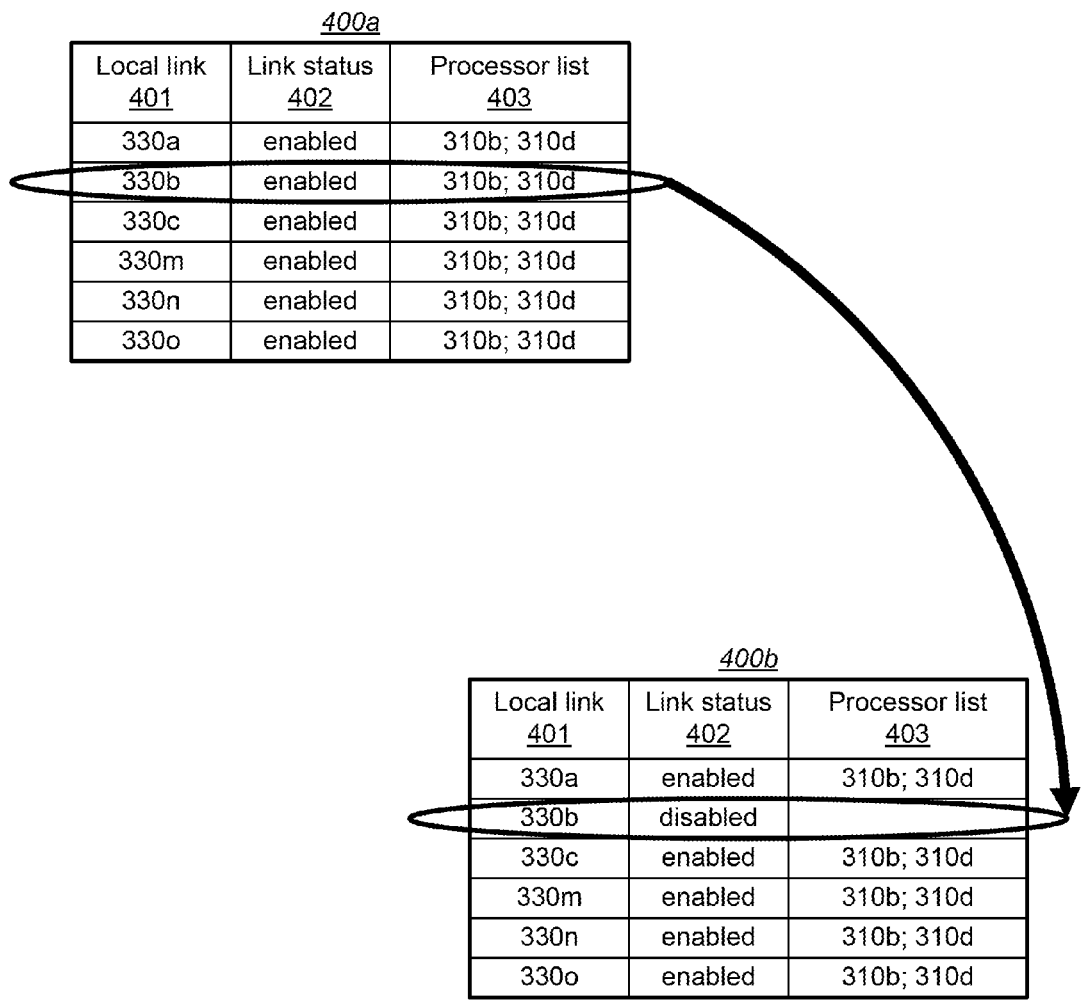
FIG. 4 includes two tables demonstrating changes to a routing table.

It is noted that tables 400*a-b* illustrated in FIG. 4 are merely examples of routing information that may be included in a given processor. The routing information is presented in a tabular format for clarity, and is not intended to imply that this information is organized into tables in all embodiments. Routing information, in some embodiments, may be maintained in one or more registers. In some embodiments, the routing information shown in tables 400a-b may represent a limited number of the overall routing information in a given core.

Methods for Managing a Communication Network

Figure 5:
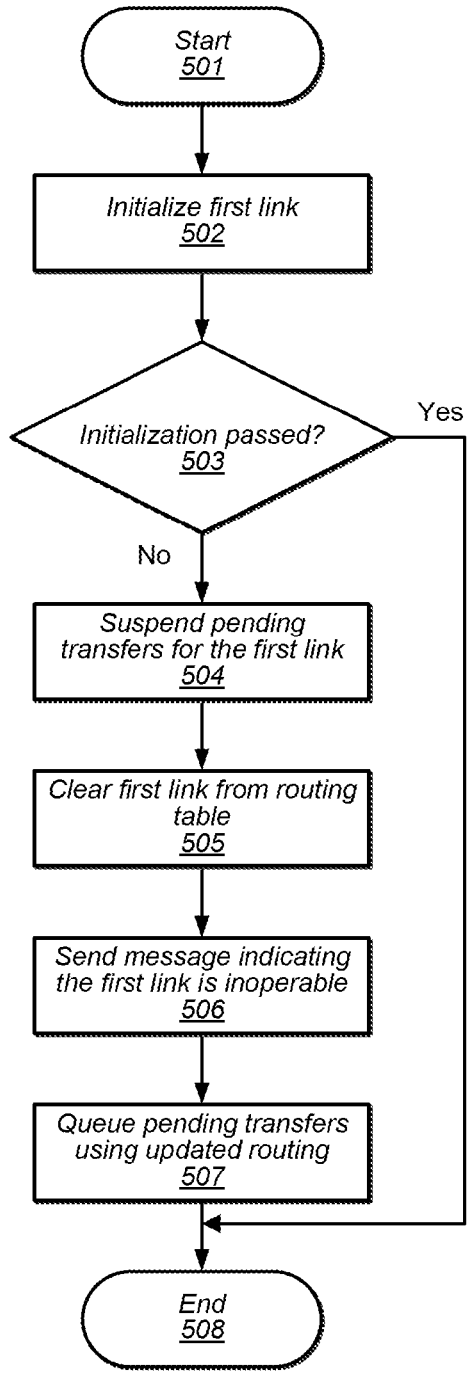
FIG. 5 illustrates a flowchart depicting an embodiment of a method for detecting an inoperable communication link coupled to a processor.

Moving to FIG. 5, a flowchart depicting an embodiment of a method for handling an inoperable communication link coupled to a processor is illustrated. Method 500 may be applicable to multi-processor systems, such as system 100 in FIG. 1 or system 300 in FIG. 3. Referring collectively to FIG. 3 and method 500 of FIG. 5, the method may begin in block 501.

A first processor may initialize a first link (block 502). The initialization may occur as part of a power-on process for system 300. In some cases, the initialization may be in response to a communication error occurring via the first link. The first processor, such as, for example, processor 310a, may send a message to a bus switch, for example, bus switch 320a, via communication link 330a. The message may include data, request for data, or other instructions, intended for a destination processor such as processor 310b. In some cases the message may be an idle packet, i.e., a message without data or instructions that may be used to keep a communication path active between processor 310a and bus switch 320a, which may also be used to detect transmission errors on link 330a. If the message is an idle packet, then the destination may be bus switch 320a. If an error is detected in response to sending this message, then processor 310a may perform an initialization process (e.g., a link training process) on communication link 330a. In some embodiments, processor 310a may attempt to resend a message in response to an error before performing a link training process.

The method may depend on the result of the initialization process on link 330a (block 503). If the path via link 330a to bus switch 320a is operable, the initialization process should pass, indicating valid data can be passed to and from bus switch 320a. If the initialization passes, then the method may end in block 508. If, however, the initialization process fails, link 330a may be considered inoperable, either due to link 330a being down or due to bus switch 320a being inoperable itself. The failure of the initialization process may create an exception in processor 310a, causing a core in processor 310a to enter a service routine and, in some embodiments, to enter a privileged or hyper-privileged mode. The method may move to block 504 to prevent further messages through link 330a.

Processor 310a may suspend transfer of any pending messages queued for transmittal through link 330a (block 504). Other messages may be pending in processor 310a, for transmission through inoperable link 330a. These other messages may also be destined for processor 310b or may be destined for another processor routed through link 330a, such as processor 310d. In some embodiments, the suspended messages may be kept, but placed on hold until the now inoperable path to processor 310b has been removed from corresponding entries of the routing tables. In other embodiments, the messages may be dropped or deleted and then reconstructed after the now inoperable path to processor 310b has been removed from the routing tables. In some embodiments, all pending messages, including those not routed through link 330a, may be suspended in case a response from the destination processor is routed via link 330a.

Routing information in processor 310a may be modified to remove link 330a from the list of available routing paths to other processors (block 505). The core in processor 310a that is executing the service routine may remove link 330a from routing information in tables and/or registers in processor 310a. Removing link 330a may consist of setting or clearing one or more bits in corresponding routing information registers. In some embodiments, the core modifying the routing information registers may need to be in the privileged or hyper-privileged mode in order make any changes to the routing information registers.

In some cases, there may not be enough available paths to support communication from processor 310a to other processors in the communication network with which processor 310a communicates. In such an event, the core executing the service routine may notify an operating system running on system 300. In response, the operating system may alert a user program (i.e., application software) of the system of the error condition.

Processor 310a may send a notification message to other processors, such as processors 310b-d, to inform them that link 330a is inoperable (block 506). The notification message may correspond to a link failure message, which may indicate the inoperable link. In some embodiments, the communication network may support a broadcast mode such that processor 310a may generate a single link failure message alerting other processors to the inoperable link 330a and broadcasting the link failure message to all available and active links coupled to processor 310a, i.e., links 330b-c and 330m-o. Processors 310b-d may take appropriate actions, as will be detailed below. In other embodiments, processor 310a may send multiple link failure messages, at least one link failure message for each other processor 310b-d via each available link coupled to processor 310a. In addition to notifying other processors 310b-d of inoperable link 330a, the multiple link failure messages may be used to discover other inoperable links in system 300.

In some embodiments, however, processor 310a may not have a capability to select a given link or path to send each of the multiple link messages. In such embodiments, to track which active links other than the inoperable link 330a are used for sending link failure messages, an additional mechanism may be used. For example, one or more status registers may be used by processor 310a to track the paths that the link failure messages have traveled. A given bit of a register may correspond to a link in system 300 and may be set (or cleared) when the corresponding link transfers a link failure message. Before sending the multiple link failure messages to other processors, processor 310a may clear (or set) bits of the status registers corresponding to active links. If a bit corresponding to an active link is not set (or cleared) after the link failure messages have been sent then processor 310a may send another round of link failure messages to try to get the messages transmitted via the previously unused links. This process may be repeated until processor 310a determines a suitable number of active links have been used to transmit the link failure messages.

Processor 310a may now queue messages that were suspended (block 507). In some embodiments, the suspended message may be re-activated and queued for transmission, with an updated routing table determining the new path. In other embodiments, path information within each message may need to be updated with the new routing information and then queued again for transmission. If the suspended messages were deleted, then the messages may be reconstructed and queued for transmission. The method may end in block 508.

It is noted that method 500 of FIG. 5 is merely an example. Variations of the disclosed method are possible. For example, different numbers and different orders of the presented blocks may be employed. For example, in other embodiments, operations in blocks 505 and 506 may be in reverse order or may be completed in parallel.

Figure 6:
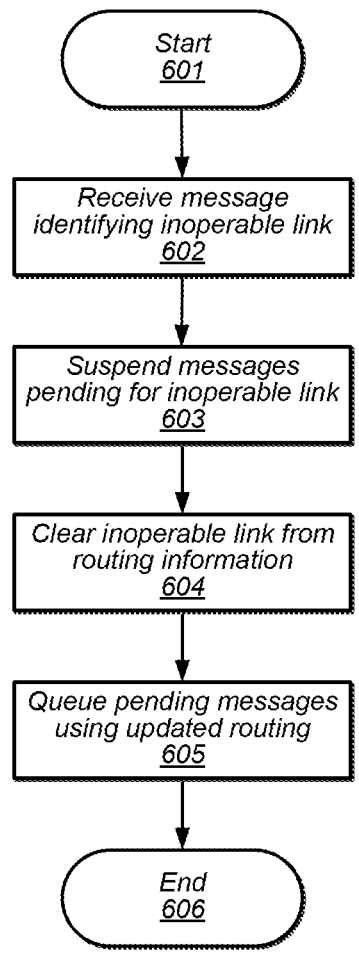
FIG. 6 illustrates a flowchart for an embodiment of a method for receiving a message that an inoperable communication link has been detected.

Turning now to FIG. 6, a flowchart is presented illustrating an embodiment of a method for receiving a message that an inoperable communication link has been detected. Method 600 may be applicable to multi-processor systems, such as system 100 in FIG. 1 or system 300 in FIG. 3. Referring collectively to FIG. 3 and method 600 of FIG. 6, the method may begin in block 601.

A processor may receive a link failure message from another processor that an inoperable link has been identified (block 602). Continuing the example from FIG. 5, processor 310*a* may send a message to other processors in system 300 indicating link 330*a* is inoperable. Another processor in system 300, processor 310*b* for example, may receive the message. Receiving the indication that link 330*a* is inoperable may cause a core or co-processor in processor 310*b* to enter a service routine and, in some embodiments, to enter a privileged or hyper-privileged mode.

Processor 310*b* may suspend message transmissions pending for the inoperable link (block 603). If processor 310*b* includes any transfers pending for a destination via link 330*a*, then the core in processor 310*b* that is executing the service routine may suspend those transmissions. In some embodiments, the messages may be deleted, while in other embodiments, the messages may be put on hold without deleting the message contents.

The core may clear the inoperable link from routing information (block 604). The core executing the service routine in processor 310*b* may remove the path including inoperable link 330*a* from the routing information in processor 310*b*. For example, processor 310*b* may include a path via bus switch 320*a*, and therefore link 330*a*, to processor 310*a*. The core may remove the path via bus switch 320*a* from the routing information to avoid inoperable link 330*a*. In addition, processor 310*b* may determine if at least one link is available for other processors with which processor 310*b* communicates.

Using the updated routing information, processor 310*b* may queue the suspended messages for transmission (block 605). If the suspended messages were held without deleting, then each suspended message may be queued again for transmission. In some embodiments, if routing information is included in the message, the message may be updated with the new routing information before queuing. If the suspended messages were deleted, then the deleted messages may be constructed again and queued for transmission. The method may end in block 606.

Method 600 of FIG. 6 is merely an example. In other embodiments, different operations and different numbers of operations are possible and contemplated. Operations may be performed in a different order and, in some embodiments, may be performed in parallel.

Figure 7:
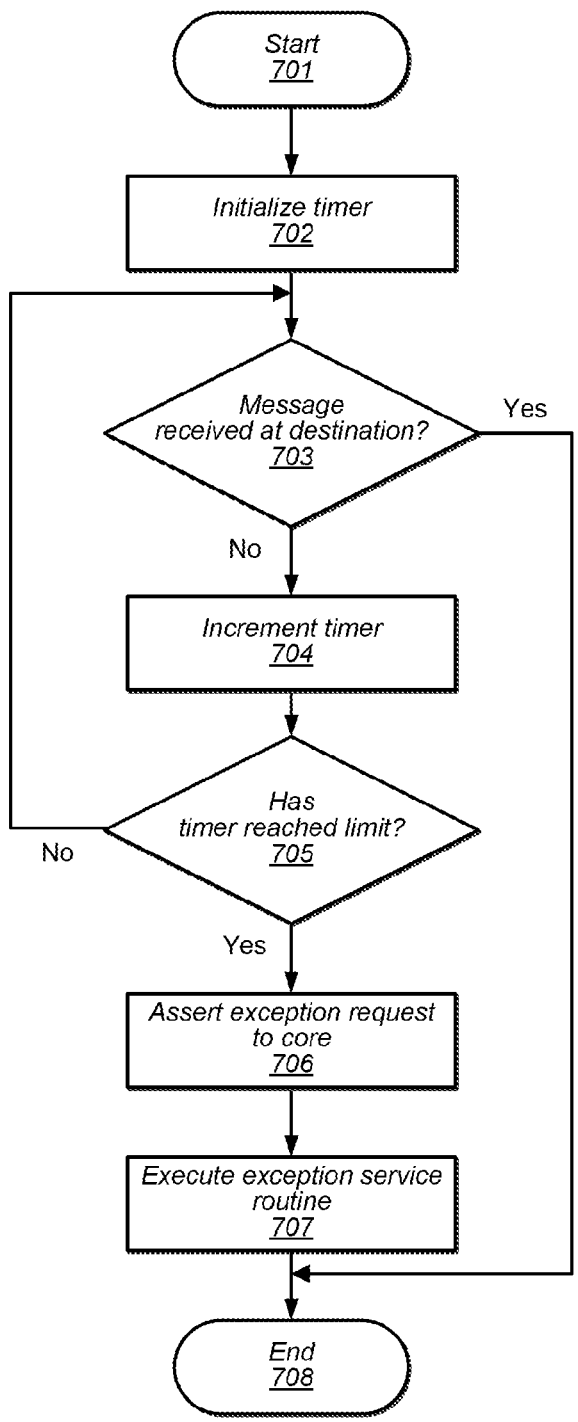
FIG. 7 is a flowchart illustrating an embodiment of a method for detecting an inoperable remote communication link.

Moving now to FIG. 7, a flowchart illustrating an embodiment of a method for detecting an inoperable remote communication link coupled to a remote processor is presented. Method 700 may be applicable to a multi-processor system, such as systems 100 and 300 in FIG. 1 and FIG. 3, respectively. Referring collectively to system 300 of FIG. 3 and method 700 of FIG. 7, the method may begin in block 701 with a message having been sent by a source processor (i.e., processor 310*a*) via a communication path (such as, for example, communication link 330*a* to bus switch 320*a* to communication link 330*g*) to a destination processor (i.e., processor 310*b*).

In response to sending the message to processor 310*b*, logic in processor 310*a* may initialize a timer circuit (block 702). The logic in processor 310*a* may correspond to a link interface of processor 310*a*, for example, link interface 260*a* as illustrated in FIG. 2. In other embodiments, another functional block may initialize the timer circuit, such as, for example a corresponding data management unit. Any suitable form of timer circuit may be utilized, such as, for example, count-up or count-down timer circuits. In various embodiments, initializing the timer may consist of setting an initial value and enabling the timer circuit to begin counting.

The method may depend on the message being received by processor 310*b* (block 703). The routing path of the sent message may include remote link 330*g*. As part of a protocol for the communication network of system 300, processor 310*b* may send an acknowledgment to processor 310*a* upon receiving the message from processor 310*a*. If link interface 260*a* receives acknowledgment that processor 310*b* received the message, then the method may end in block 708. Otherwise, the method may move to block 704 to increment the timer circuit.

The timer circuit may be incremented if no acknowledgment is received (block 704). Although the term "increment" is used herein, it is understood that some embodiments of timer circuits, such as count-down timers may decrement a count value rather than increment. The timer circuit may increment dependent on a clock signal within processor 310*a*, such as a system clock or bus clock, or a clock signal originating external to processor 310*a*.

The method may depend on a value of the timer (block 705). The timer circuit may assert a signal upon reaching or exceeding a predetermined value. The predetermined value may correspond to an amount of time in which an acknowledgment from processor 310*b* is expected to be received. In some embodiments, the amount of time may allow for network latencies due to various reasons. If the timer has not reached the predetermined value, then the method may return to block 703 to determine if the message was received by processor 310*b*. Otherwise, if the predetermined value of the timer circuit has been reached, then the method may move to block 706 to assert the signal.

The timer circuit may assert the signal indicating an acknowledgment has not been received in the predetermined amount of time (block 706). The asserted signal may be received by link interface 260*a*, which may, in response, assert an interrupt or an exception to a core in processor 310*a*. In other embodiments, the asserted signal from the timer circuit may directly trigger the interrupt or exception to the core. The interrupt or exception may cause the core to enter a privileged or hyper-privileged mode which may allow the core to modify routing information in processor 310*a*.

The core may execute a service routine associated with the interrupt or exception (block 707). The service routine may include instructions causing the core to perform one or more operations similar to those described in blocks 504 through 507 in method 500 in FIG. 5. For example, remote link 330*g* may be removed from or disabled in the routing table of processor 310*a*. Upon completing the service routine, the core may exit the service routine as well as, in some embodiments, exit the privileged or hyper-privileged mode. The method may end in block 708.

It is noted that method 700 of FIG. 7 is merely an example for demonstrative purposes. Variations of the disclosed method are possible. For example, different numbers and different orders of the presented blocks may be employed, and the contents of memory and registers of a stuck core may be copied into a buffer memory after block 705.

Figure 8:
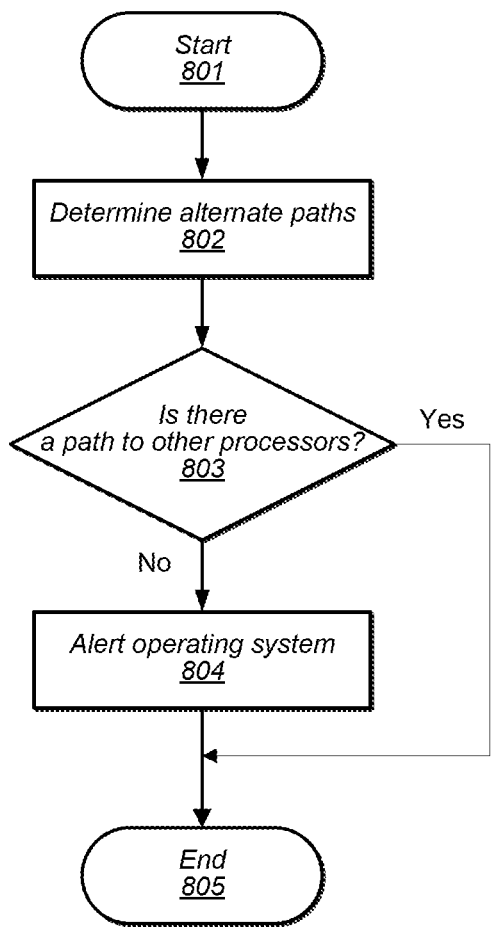
FIG. 8 is a flowchart depicting an embodiment of a method to determine that there are alternate paths around an inoperable link.

Turning to FIG. 8, a flowchart depicting an embodiment of a method to determine alternate paths around an inoperable link is presented. Method 800 may be performed whenever a link is removed from a routing table, such as, for example, in response to performing operations associated with blocks 505, 604, and 707, in FIGS. 5, 6, and 7, respectively. Method 800 may be applicable to multi-processor systems, such as systems 100 and 300 in FIG. 1 and FIG. 3, respectively. Referring collectively to FIG. 3 and method 800 of FIG. 8, the method may begin in block 801, after processor 310a has detected communication link 330a is inoperable.

Processor 310a may determine alternate paths that exclude inoperable link 330a (block 802). Processor 310a, or more specifically, a core within processor 310a, may update routing information by determining which paths include link 330a and marking these paths as invalid. In some embodiments, alternate paths may be available and active, such as, for example, if all paths are enabled by default during network initialization. In other embodiments, processor 310a may search available paths to find and assign alternate paths to other processors in system 300 for which the current path is invalid. In such embodiments, processor 310a may assign a next available path to replace each invalid path, while in other embodiments, processor 310a may utilize path selection techniques to balance data traffic across the network or to preserve an organizational structure of the network. For example, as disclosed in regards to FIG. 3, links 330a-1 may be assigned to a first network plane while links 330m-x may be assigned to a second plane. In embodiments in which inoperable link 330a belongs to the first plane, processor 310a may limit selection of replacement paths to those using links 330b-1. Conversely, if a link in the second plane were inoperable, for example, link 330m, then processor 310a may limit selection of replacement paths to those using links 330n-x.

The method may depend on available paths (block 803). In some embodiments, processor 310a may determine if there is at least one valid path to each of the other processors 310b-d. In other embodiments, processor 310a may only check for a valid path to each processor 310b-d with which processor 310a communicates. In some embodiments, in which processor 310a is coupled to processor 310c via processor interconnect 340a, processor 310a may not require a path to processor 310c via links 330. In other embodiments organized into multiple network planes, processor 310a may determine if there is at least one path each to processor 310b and 310d in each of the network planes. If processor 310a determines there are adequate paths still valid, then the method may end in block 805. Otherwise, the method may move to block 804 to alert an operating system and/or application software.

Processor 310a may alert an operating system (or in some embodiments, more than one operating system) running on system 300 that an insufficient number of paths remain valid (block 804). Processor 310a may assert an interrupt or exception signal to cause a software process that is part of the operating system to indicate a network communication error condition. In other embodiments, processor 310a may modify a value in a register or other memory location to cause the software process to indicate the network error condition. The method may end in block 805.

Method 800 of FIG. 8 is merely an example. In other embodiments, different operations and different numbers of operations are possible and contemplated. Operations may be performed in a different order.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a plurality of bus switches; and
   a plurality of processors, wherein each processor is coupled to each bus switch of the plurality of bus switches, wherein each processor is configured to:
     store respective routing information usable to route messages to one or more other processors of the plurality of processors;
     initiate a transfer of data to a given bus switch of the plurality of bus switches; and
     detect that a respective link to the given bus switch is inoperable;
   wherein, in response to a given processor of the plurality of processors detecting an inoperable link between the given processor and the given bus switch, the given processor is further configured to:
     send a notification message, using the respective routing information, to at least one other processor of the plurality of processors via at least one other bus switch of the plurality of bus switches, wherein the notification message includes identifying information for the inoperable link;
     track a path of the notification message through one or more operable links to the at least one other bus switch and the at least one other processor by setting, to a particular value, a respective register bit corresponding to each of the one or more operable links and monitoring changes to values of the respective register bits; and
     modify the respective routing information stored in the given processor to remove a reference to the inoperable link; and
   wherein the at least one other processor is configured to modify the respective routing information stored in the at least one other processor to remove a reference to the inoperable link in response to receiving the notification message from the given processor.

2. The system of claim 1, wherein the notification message includes information identifying that the inoperable link is inoperable.

3. The system of claim 1, wherein the given processor is further configured to discard pending data transfers that are queued to be sent by the given processor, in response to detecting the inoperable link.

4. The system of claim 1, wherein each processor of the plurality of processors is further configured to measure a predetermined amount of time from initiating a data transfer to another processor.

5. The system of claim 4, wherein each processor is further configured to assert an error signal in response to a determination that the data transfer was not received by the another processor within the predetermined amount of time.

6. The system of claim 1, wherein the at least one other processor is further configured to discard pending data transfers that are queued to be sent by the at least one other processor, in response to receiving the notification message from the given processor.

7. The system of claim 1, wherein the given processor is further configured to:
   detect the inoperable link to the given bus switch while operating in a first mode, wherein the given processor prevents access to the respective routing information while operating in the first mode;
   enter a second mode from the first mode in response to detecting the inoperable link, wherein the given processor allows access to the respective routing information while operating in the second mode; and
   send the notification message to the at least one other processor via the at least one other bus switch in response to entering the second mode.

8. A method, comprising:
   storing respective routing information in each processor of a plurality of processors usable to route messages between two or more processors of the plurality of processors;
   initiating a transfer of data by a given processor of the plurality of processors to a first bus switch of a plurality of bus switches;
   detecting an inoperable link between the given processor and the first bus switch;
   sending a notification message, using the respective routing information, to at least one other processor of the plurality of processors via at least a second bus switch of the plurality of bus switches, in response to detecting the inoperable link, wherein the notification message includes identifying information for the inoperable link;
   tracking a path of the notification message through one or more operable links to the at least second bus switch and the at least one other processor by setting, to a particular value, a respective register bit corresponding to each of the one or more operable links and monitoring changes to values of the respective register bits;
   modifying respective routing information to remove a reference to the inoperable link from the given processor in response to detecting the inoperable link; and
   modifying respective routing information to remove a reference to the inoperable link from the at least one other processor in response to receiving the notification message from the given processor.

9. The method of claim 8, wherein the notification message includes information identifying that the inoperable link is inoperable.

10. The method of claim 8, further comprising suspending pending data transfers that are scheduled to be sent by the given processor, in response to detecting the inoperable link.

11. The method of claim 8, further comprising measuring a predetermined amount of time from initiating a data transfer to another processor.

12. The method of claim 11, further comprising asserting an error signal in response to determining the data transfer was not received by the another processor in the predetermined amount of time.

13. The method of claim 8, further comprising suspending pending data transfers that are scheduled to be sent by the at least one other processor, in response to receiving the notification message from the given processor.

14. The method of claim 8, further comprising:
   detecting the inoperable link while the given processor is operating in a first mode, wherein the given processor prevents access to the respective routing information while operating in the first mode;
   switching the given processor from the first mode to a second mode in response to detecting the inoperable link, wherein the given processor allows access to the respective routing information while operating in the second mode; and
   sending the notification message to the at least one other processor via the at least a second bus switch in response to entering the second mode.

15. An apparatus, comprising:
   a plurality of communication links, wherein each communication link of the plurality of communication links is coupled to a respective bus switch of a plurality of bus switches;
   at least one register configured to store routing information usable to route messages via each communication link of the plurality of communication links; and
   a logic unit configured to:
      initiate a transfer of data via a first communication link of the plurality of communication links;
      detect that the first communication link is inoperable;
      send a notification message, using the routing information, via one or more communication links of a subset of the plurality of communication links in response to detecting that the first communication link is inoperable, wherein the subset of the plurality of communication links excludes the first communication link, and wherein the notification message includes identifying information for the first communication link;
      track a path of the notification message through the one or more communication links to the respective bus switch by setting, to a particular value, a respective register bit corresponding to each of the one or more communication links and monitoring changes to values of the respective register bits; and
      modify the routing information to remove a reference to the first communication link from the at least one register in response to detecting that the first communication link is inoperable.

16. The apparatus of claim 15, wherein the notification message includes information identifying that the first communication link is inoperable.

17. The apparatus of claim 15, wherein the logic unit is further configured to discard pending data transfers scheduled to be sent in response to detecting the first communication link is inoperable.

18. The apparatus of claim 15, wherein the logic unit includes a timer circuit, wherein the timer circuit is configured to measure a predetermined amount of time from initiating the transfer of the data.

19. The apparatus of claim 18, wherein the timer circuit is further configured to assert a signal in response to a determination that an acknowledgment was not received in the predetermined amount of time.

20. The apparatus of claim 15, wherein the logic unit is further configured to:
   detect that the first communication link is inoperable while operating in a first mode, wherein the logic unit prevents access to the at least one register while operating in the first mode;
   enter a second mode from the first mode in response to detecting that the first communication link is inoperable, wherein the logic unit allows access to the at least one register while operating in the second mode; and send the notification message via the one or more communication links of the subset in response to entering the second mode.

\* \* \* \* \*